(12) United States Patent
Chung et al.

(10) Patent No.: US 9,378,294 B2
(45) Date of Patent: Jun. 28, 2016

(54) PRESENTING SOURCE REGIONS OF RENDERED SOURCE WEB PAGES IN TARGET REGIONS OF TARGET WEB PAGES

(75) Inventors: Wook Jin Chung, Kirkland, WA (US); Gupta Garuda, Redmond, WA (US); Rahul Sudhir Kumar, Kirkland, WA (US); Chad Steven Estes, Woodinville, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 258 days.

(21) Appl. No.: 12/971,664

(22) Filed: Dec. 17, 2010

(65) Prior Publication Data
US 2012/0159307 A1     Jun. 21, 2012

(51) Int. Cl.
*G06F 17/20* (2006.01)
*G06F 17/30* (2006.01)

(52) U.S. Cl.
CPC ...... *G06F 17/3089* (2013.01); *G06F 17/30905* (2013.01)

(58) Field of Classification Search
CPC .......................... G06F 17/211; G06F 17/30905
USPC ................................ 715/234, 240, 211, 253
See application file for complete search history.

(56) References Cited

U.S. PATENT DOCUMENTS

| 6,976,210 | B1 * | 12/2005 | Silva et al. | 715/205 |
| 7,340,499 | B1 * | 3/2008 | Casella | 709/201 |
| 7,783,967 | B1 * | 8/2010 | Carnell et al. | 715/234 |
| 7,917,846 | B2 * | 3/2011 | Decker et al. | 715/234 |
| 7,975,019 | B1 * | 7/2011 | Green et al. | 709/217 |
| 8,065,620 | B2 * | 11/2011 | Chen et al. | 715/744 |
| 2003/0101412 | A1 * | 5/2003 | Eid | 715/513 |
| 2003/0229857 | A1 * | 12/2003 | Sayuda et al. | 715/517 |
| 2004/0088653 | A1 | 5/2004 | Bell et al. | |
| 2005/0065806 | A1 | 3/2005 | Harik | |

(Continued)

FOREIGN PATENT DOCUMENTS

KR     100961680 B1     6/2010
WO     2008154114 A1    12/2008

OTHER PUBLICATIONS

"International Search Report", Mailed Date: Jul. 9, 2012, Application No. PCT/US2011/065689, Filed Date: Dec. 17, 2011, pp. 13.

(Continued)

*Primary Examiner* — Mohammed-Ibrahim Zuberi
(74) *Attorney, Agent, or Firm* — Bryan Webster; Judy Yee; Micky Minhas

(57) ABSTRACT

A target web page may embed resources hosted by a source server. However, this embedding may result in compatibility and/or security issues; e.g., the dimensions of the embedded resource may skew the layout of the target web page. Instead, a source web page may be rendered separately from a target web page, and a source region of the source web page (e.g., a region defined by a set of coordinates) may be extracted from the source web page and may be presented in a target region of the target web page. The elements of the source region may be displayed and executed in isolation within the source web page, and may operate within a source domain (e.g., communicating with the source server and accessing cookies stored by the source server), yet may not interact with the elements of the target web page, thereby alleviating many compatibility and security problems.

20 Claims, 9 Drawing Sheets

(56) References Cited

U.S. PATENT DOCUMENTS

| | | | |
|---|---|---|---|
| 2005/0076097 A1* | 4/2005 | Sullivan et al. | 709/218 |
| 2006/0020510 A1 | 1/2006 | Vest | |
| 2006/0277460 A1* | 12/2006 | Forstall et al. | 715/513 |
| 2007/0033532 A1 | 2/2007 | Lemelson | |
| 2008/0097830 A1 | 4/2008 | Kim | |
| 2008/0201452 A1* | 8/2008 | Athas et al. | 709/219 |
| 2009/0157507 A1* | 6/2009 | Agius et al. | 705/14 |
| 2009/0287572 A1 | 11/2009 | Whelan | |
| 2010/0031190 A1* | 2/2010 | Hall et al. | 715/806 |
| 2010/0070899 A1* | 3/2010 | Hunt et al. | 715/769 |
| 2011/0119571 A1* | 5/2011 | Decker et al. | 715/205 |

OTHER PUBLICATIONS

"Ad Creative Impression, Click, and Interaction Counting"—Published Date: Feb. 4, 2010 http://www.metaq.com/pdf?article=creative/specs/BAT_AdCreativeImpressionClickAndInteractionCounting.

"Marketing Innovation â€ Automatic Ad Creation"—Published Date: Oct. 16, 2006 http://www.articlealley.com/article_94698_15.html.

"Browser News"—Published Date: Sep. 11, 2010, http://www.upsdell.com/BrowserNews/resources.htm.

"Web Advertising Network"—Retrieved Date: Sep. 27, 2010 http://www.ewasystems.com/webadnet.html#FAQ.

"Automatic Ad Creation and Management for Retailers"—Retrieved Date: Sep. 27, 2010 http://www.revionics.com/advertising.aspx.

Translation of 3rd Chinese Office action, application No. 201110426201.4, Mail Date: Jan. 5, 2015, 3 pages.

3rd Chinese Office action, application No. 201110426201.4, Mail Date: Jan. 5, 2015, 4 pages.

Proposed Claims for response to 3rd Chinese Office action, 4 pages.

Translation of 2nd Chinese Office action, application No. 201110426201.4, Mail Date: Jul. 16, 2014, 3 pages.

Proposed Claims for response to 2nd Chinese Office action, 4 pages.

2nd Chinese Office action, application No. 201110426201.4, Mail Date: Jul. 16, 2014, 4 pages.

First Chinese Office Action cited in Chinese Application No. 201110426201.4 dated Jan. 16, 2014, 1 pg.

Reply first Chinese Office Action cited in Chinese Application No. 201110426201.4 dated Apr. 28, 2014, 4 pgs.

Chinese Notice of Allowance cited in Chinese Application No. 201110426201.4 dated Jun. 24, 2015, 2 pgs.

* cited by examiner

PRESENTING SOURCE REGIONS OF RENDERED SOURCE WEB PAGES IN TARGET REGIONS OF TARGET WEB PAGES

BACKGROUND

Within the field of computing, many scenarios involve a web page provided by a first server that includes one or more resources provided by a second server. As a first example, the second server may host one or more resources, such as an image or an audio or video recording, that may be embedded by reference in the web page provided by the first server. As a second example, the second server may provide information, such as a set of headlines and links to news stories or a set of stock symbols and rates, that may be included in the web page provided by the first server.

In these and other scenarios, a target server (e.g., the first server) may provide a target web page that includes one or more elements hosted by a source server (e.g., the second server). As a first technique for achieving this inclusion, the target web page provided by the target server may include, among the references to resources hosted by the target server that are included in the web page (e.g., images, scripts written in programming languages such as Javascript, and cascading style sheet (CSS) objects specifying a formatting of the web page), one or more references to resources hosted by the source server. The reference may either natively embed the resource in the target web page, or may encapsulate the resource (potentially including an entire web page of the second server) in a construct such as an iframe. When a user of a computer operates a web browser to access the target web page, the target server may send the target web page to the browser, including the references to resources hosted by the target server and the source server. Upon receiving the target web page, the web browser may scan the web page to identify the references to various resources included in the web page, may retrieve the referenced resources from the target server and the source server, and may render the resources (including the resources hosted by the source server) into the web page to be presented to the user.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

The inclusion of resources hosted by the source server in the target web page provided by the target server may be advantageous, e.g., for permitting cooperative embedding, data sharing, and advertising. However, the inclusion of resources by reference (e.g., where the target web page includes references to the resources hosted by the source server, which are retrieved and rendered into the target web page in an equivalent manner as for the resources hosted by the target server) may present some disadvantages. As a first example, if the embedded resources do not correspond to the target web page (e.g., the dimensions allocated for the resource), the embedded resource and/or the target web page may appear skewed or may not function properly unless developer of the source web page may have to develop another version of the embedded resource. In scenarios where a resource of the source server is embedded in many target web pages, this redevelopment may be very costly and time-consuming, but may provide little benefit to either the source web page or the target web page. Moreover, the use of an iframe may result in the embedding of an entire resource, such as an entire web page of the source server. This may be undesirable—e.g., the developer of the target web page may wish to present only a portion of the resource, such as a portion of a web page or an image provided by the source server, into the target web page—but the iframe construct does not support this usage.

As a second example, the resource may not be fully compatible with the target web page; e.g., the resource may comprise an image having a particular size, but the target web page may embed the resource in a target region of a different size, resulting in an undesirable skewing of the dimensions of the image (e.g., by proportionately or disproportionately scaling the image to meet the size of the target region) and/or the target web page (e.g., by distorting the spacing and other formatting of the target web page). As another such example, an active resource provided by the source server, such as a script or executable object, may be incompatible with the target web page, and may not execute correctly within the target web page. Such incompatibilities may become more prevalent, e.g., as the formatting of the target web page and/or the resource change. As a third example, encapsulating a resource provided by a source server in an iframe may raise some security concerns, and/or may invoke some security restrictions that limit the functionality of the resource. For example, exploits have been conceived for circumventing the cross-domain restriction policy of the web browser between the contents of an iframe and the target web page, such that the target web page may communicate with resource provided in the iframe, and new exploits may be identified in the future that diminish the security and trust of the iframe construct.

Presented herein are techniques for improving the inclusion of elements provided by a source server in a target web page provided by a target server. In accordance with these techniques, the resources of the source server are not included by reference by the target web page, and are not rendered into the target web page in a similar manner as the resources provided by the target server. Rather, the source server may provide a source web page, which may include one or more resources hosted by the source server (e.g., text, images, audio or video recordings, scripts, or executable objects). A source region of the source web page, such as a particular area of the source web page defined by a particular coordinate set, may be designated to appear in a target region of the target web page. Accordingly, the web browser of the user may render the source web page, but may not display the source web page to the user. Rather, the web browser may also render the target web page, separately from the rendering of the source web page. The web browser may then extract the source region of the source web page, and may present the source region within the target region of the target web page. Thus, rather than embedding the elements comprising the source region as functional elements of the target web page, which may interact with (desirably and undesirably) and/or affect the functionality of the target web page, the source region may be functionally limited to operate within the source web page, but may nevertheless appear within the target region of the target web page.

These techniques may present several advantages as compared with embedding the resources. As a first example, allowing a target web page to specify (e.g., as a set of coordinates) a particular source region of the source web page to present within the target region of the target web page may significantly reduce the redevelopment of the resources presented therein. Rather than the developer of the source web page having to generate several versions of an embedded image to match the layout and operating environment of different target web pages, the target web page may simply include in the target region a source region comprising a portion of the currently existing source web page. In the context of advertising, the target web page may simply specify any selected portion of the source web page within the target region of the target web page. For currently existing advertisements included in the source web page, the target web page may simply adjust the dimensions of the selected source region to match the target region. Moreover, the developer of the source web page may not have to create advertisements at all; the target web page may present any selected portion of the source web page within the target region, and may therefore create advertisements out of the ordinary content of the source web page. As a third example, the target web page may present source regions of the source web page without the awareness or consent of the source server, thereby facilitating "mash-ups" of the content included in the source web page with other content.

As a second exemplary advantage of the techniques presented herein, the elements comprising the source region do not functionally interact with any aspect of the target web page, and do not affect the functionality thereof. For example, because the presentation of the source region is limited to the dimensions of the target region (specified by the target web page), the dimensions of elements within the source region do not affect the formatting of the target web page. Generally, elements that operate within the source web page may be presented in the target region of the target web page without any compatibility issues arising from conflicting configurations of the source web page and the target web page.

As a third exemplary advantage of the techniques presented herein, because the elements appearing within the source region are rendered within a source web page, the elements may be restricted to a domain associated with the source server, rather than the target server. Accordingly, these elements may interact with the target server and/or locally stored resources (e.g., cookies) stored on the computer and restricted to the target domain. Moreover, the source server may rely on the cross-domain restriction policy of the web browser to prevent the elements of the target web page from exploiting the inclusion of the source region to access the locally stored resources that are restricted to the source domain; and, conversely, the target server may rely on the cross-domain restriction policy to prevent the elements of the source region from interacting with the locally stored resources that are restricted to the target domain. As a result, the source region may access cookies and other locally stored source domain resources and may personalize the content in the source region without concern of interference by the target web page. These and other advantages may be achieved by presenting the elements of the source web page within the target region of the target web page according to the techniques presented herein.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
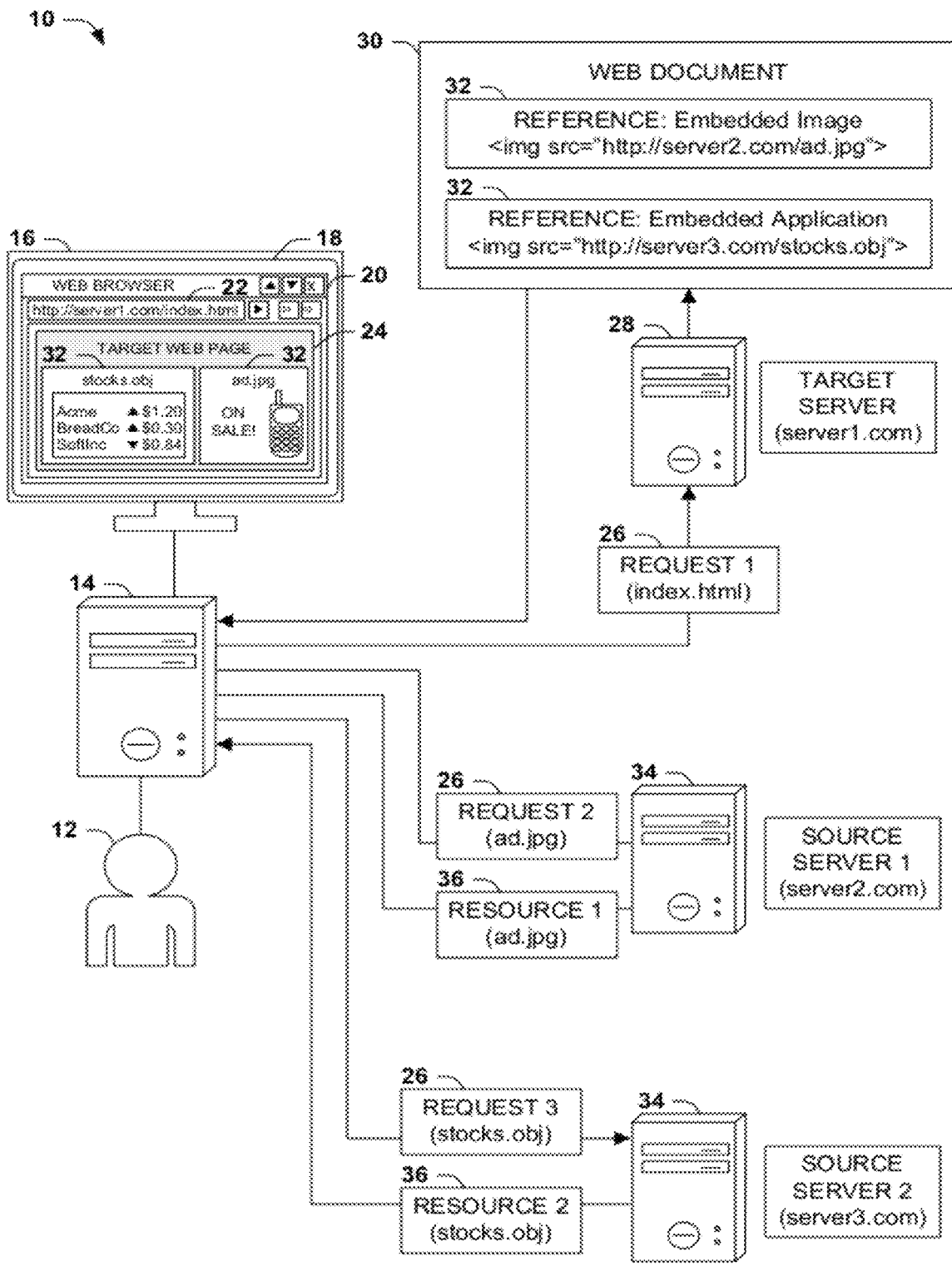
FIG. 1 is an illustration of an exemplary scenario featuring resources hosted by source servers embedded in a target web page provided by a target server.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

Within the field of computing, many scenarios involve a rendering of a web page provided by a first server, where the web page includes one or more aspects provided by a second server. As a first example, the second server may host media objects, such as images, audio or video recordings, or rendered documents, that are to be embedded in the web page provided by the first server. As a second example, the second server may host data objects, such as interpretable scripts (e.g., a Javascript code section) or data objects (e.g., an extensible markup language (XML) data file that provides data incorporated into the web site, or a cascading style sheet (CSS) that specifies the layout and formatting of various aspects of the web page, that may be utilized in various ways within the web page. As a third example, the second server may provide information that is to be included in the web page (e.g., a news feed or weblog providing a set of story headlines, each including a hyperlink to other web pages providing the full story, that are to be included in a sidebar of the web page). In these and other scenarios, the web page provided by the first server may include one or more resources provided by the second server, wherein the second server (comprising a "source server") serves as a source of data to be included in a target web page provided by the first server (comprising a "target server"). Additionally, these scenarios may be implemented by the target server with the cooperation of the source server (e.g., an advertising scenario where the source server provides images comprising advertisements that are to be included in an ad-supported target web page) or without the cooperation of the source server (e.g., a "hot-linked" image embedded in the target web page without the knowledge, consent, or cooperation of the source server).

Many techniques may be utilized to achieve this inclusion. As a first example, the source server may provide data directly to the target server, either on an independent basis (e.g., a periodic transfer of data) or on an ad hoc basis (e.g., when the target server receives a request from a user for a target web page embedding one or more resources provided by the source server). The user may therefore receive the entire web page directly from the target server, without knowledge of the existence of or data sharing by the source server. As a second example, the target web page provided by the target server may embed one or more references to resources hosted by the source server. For example, a web document formatted according to a hypertext markup language (HTML) may include one or more <img> tags, each specifying the embedding of an image within the web page. The target server may use this tag in the web document to specify an image hosted by the target server, in this manner:

<img src="http://www.target-server.com/image1.jpg"/>
... but may also use this tag to specify an image hosted by the source server in this manner:

<img src="http://www.source-server.com/image2.jpg"/>
The target server may, upon receiving a request for a web page from a user, provide a web document that includes both of these references to a web browser operated by the user. The web browser may first scan the web document to identify the referenced resources, and may then initiate requests to retrieve the resources from respective servers (e.g., the "image1.jpg" image requested from the target server, and the "image2.jpg" image requested from the source server). The web browser may issue such requests concurrently and/or consecutively, and may receive and store each resource referenced in the web document. Upon having received some or all of the resources, the web browser may render the web document as a web page that includes the images, and present the rendered web page to the user. The web browser therefore achieves the inclusion, through embedding, of various resources hosted by the source server in the web page provided by the target server.

A second technique that may be utilized to present a resource hosted by a source server within a target server involves the encapsulation of a referenced resource within a construct known as an iframe. The iframe supports the inclusion of resources in the following manner:

<iframe src="http://www.source-server.com/index.html">

Similarly to the embedding of resources, the use of an iframe within the target web page permits the inclusion of a resource stored on the source server. Again, the computer 14 of the user 12 may, upon retrieving and parsing the web document 30, identify the existence of the iframe, allocate space within the layout of the target web page, retrieve the resource from the source server, and present the resource within the target web page. While the security constraints and potential complexities of wrapping a reference to a remotely stored resource in an iframe may increase the complexity of the rendering process, an iframe hosted by the source server is typically isolated within the target web page. Additionally, an iframe may be utilized to include an entire web page of the source server within the second web page. The web pages are therefore combined and rendered together to generate the web page within the web browser.

FIG. 1 presents an illustration of an exemplary scenario 10 wherein a user 12 operates a computer 14 having a display component 16 whereupon a web browser 18 may generate a presentation 20 of one or more web sites. In this exemplary scenario 10, the user 12 may, using the web browser 18, request a target web page 24 by sending a request 26 to a target server 28 hosting the target web page 24 (e.g., by inputting an address 22 of the target web page 24). The target server 28 may provide a web document 30 (e.g., a hypertext markup language (HTML) document) that includes one or more references 32 to resources 36 hosted by respective source servers 34. For example, the web document 30 may include a first reference 32 embedding a first resource 36 hosted by a first source server 34, such as an image of an advertisement that is hosted by the first source server 34, and a second reference 32 embedding a second resources 36 hosted by a second source server 34, such as an application configured to retrieve and display stock quotes. When the computer 14 of the user 12 receives the web document 30, the computer 14 may first scan the web document 30 to identify the references 32 included therein, and may then initiate a retrieval of the referenced resources 36 by sending requests 26 to the first source server 34 and the second source server 34. Upon receiving some or all of the resources 36, the computer 14 may begin rendering the target web page 24 within the web browser 18. In this manner, the computer 14 in the exemplary scenario 10 of FIG. 1 presents the target web page 24 by retrieving the referenced resources 36, and then rendering these resources 36 together with the web document 30 to generate the presentation 20 of the target web page 24 to the user 12.

The exemplary scenario 10 of FIG. 1 may present some advantages, e.g., by promoting the cooperative embedding into the target web page 24 of resources 36 provided by the source server 34 data sharing and for promoting data sharing among the target server 28 and the source server(s) 34. The embedding of resources 36 may also be comparatively simple (e.g., achieved by including in the web document 30 a single reference 32 to the resource 36), and may be performed without the knowledge, consent, or cooperation of a source server 34. Such techniques may therefore be advantageous in scenarios involving a loosely coupled or uncoupled target server 28 and source server 34, e.g., in an advertisement network where the target server 28 presents web documents 30 upon the requests of respective users 12, where the target server 28 (providing the web document 30) and the source server 34 (providing the resource 36) do not interact or even know the identity of the other, but where the content and the resources 36 are to be appear together in the web page 24.

However, the techniques illustrated in the exemplary scenario 10 of FIG. 1 may present some disadvantages. As a first set of examples, a resource 36 may not be fully compatible with the target web page 24, such that the rendering of the target web page 24 may be distorted or non-functional. For example, a resource 36 comprising an image may be of different dimensions than anticipated by the developer of the target web page 24, and may therefore skew the layout of the target web page 24. Conversely, the web document 30 may skew the image to fit a desired area in the target web page 24, e.g., by undesirably or unintentionally scaling, cropping, and/or resampling the image. Similar consequences may arise with resources 36 comprising text to be embedded in the target web page 24. For example, formatting specified in the web document 30 (such as by a cascading style sheet (CSS)) may adversely affect text provided by the source server 34, and the text may therefore render in an overly large, small, or unreadable manner. Conversely, a large volume of text provided by the source server 34 may overflow the area provided within the target web page 24, resulting in a truncation of the text and/or a distortion of the layout of the target web page 24. As yet another example, active elements to be included within the target web page 24, such as interpretable scripts and executable binaries, may interfere with the other elements of the target web page 24, e.g., by undesirably rendering over other portions of the target web page 24, or by intercepting user input that the user wishes to direct toward other portions of the target web page 24. Alternatively, an execution framework for the resource 36 specified by the web document 30 (e.g., an applet or sandbox within which the resource 36 is to be interpreted, executed, or rendered) may be incompatible with the resource 36, thereby causing a failure or limitation of the resource 36. Such incompatibilities may become more prevalent, e.g., as developers of the source server 34 and/or the target server 28 alter the target web page 24, the resource 36, the configurations of the servers, and as the user 12 updates the computer 14 and the web browser 18.

Figure 2:
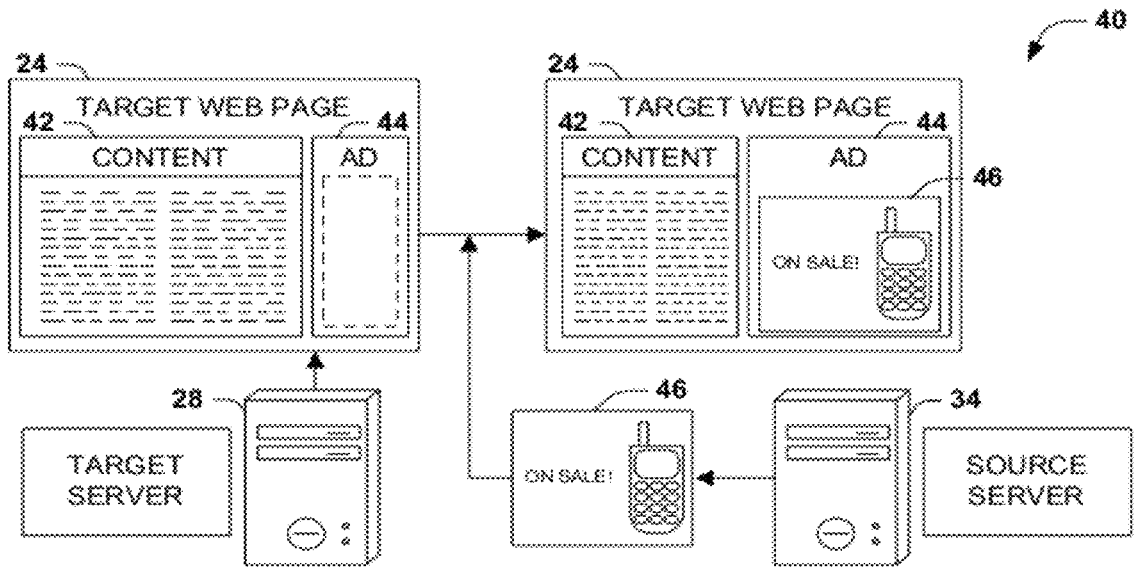
FIG. 2 is an illustration of an exemplary scenario illustrating a second possible disadvantage of embedding a resource provided by a source server in a target web page provided by a target server.

FIG. 2 presents an exemplary scenario 40 illustrating one consequence that may arise within this set of examples. In this exemplary scenario 40, a target web page 24 comprises a content area 42 comprising content (e.g., a news article), which may be provided by the target server 28 or a source server 34, and an advertising area 44 within which an advertisement 46 is to be displayed. When the computer 14 of a user 12 retrieves the web document 30 for the target web page 24, the web browser 18 may scan the web document 30 for references 32, may locate the reference 32 to the advertisement 46, may send to the source server 34 a request 26 for the advertisement 46, and, upon receiving the advertisement 46, may render the web document 30 together with the advertisement 46 to generate the target web page 24. However, in this exemplary scenario 40, a problem arises due to a discrepancy in the dimensions of the advertising area 44 and the advertisement 46; e.g., the advertising area 44 may be positioned in the margin of the target web page 24 and sized as a side banner having a tall and thin shape, but the advertisement 46 may comprise an image having a short and wide shape that is suitable for positioning at the bottom of the target web page 24. This discrepancy may arise, e.g., due to an error on the part of the developer of the target web page 24 and/or the developer of the source server 34 or a misunderstanding therebetween. As a result, when the advertisement 46 is rendered together with the web document 30, the shape and size of the advertisement 46 may cause the advertising area 44 to expand considerably in width, thereby undesirably compressing the content area 42. Additionally, while a correctly sized advertisement 46 may have substantially or completely filled the advertising area 44, the incorrectly sized advertisement 46 may leave a significant amount of space at the top and bottom of the advertising area 44. Together, these consequences, resulting from a rendering together of the web document 30 and the advertisement 46, result in a degraded visual appearance of the target web page 24. The scaling problems illustrated in the exemplary scenario 40 of FIG. 2 also apply to iframes. If the target web page 24 defines a size of the iframe, then the document rendered within the iframe is rendered with the specified dimensions, and may therefore be presented as an inappropriately small or large document within the iframe.

These discrepancies and incompatibilities may limit many scenarios involving the embedding of a resource 36 hosted by a source server 34 in the target web page 24 and/or the importing of the resource 36 or a web document 30 of the source server 34 within an iframe. As a first such example, in the context of advertising, an advertiser may have developed some advertising resources that are hosted by the source server 34, such as a banner ad or an interactive applet. However, because of size or compatibility discrepancies with a target web page 24, a developer may have to adapt the resource 36 in order to match the target web page 24. This redevelopment may occur on a wide scale if the resource 36 is embedded in many target web pages 24 having different properties, thereby incurring a significant and perhaps large development cost. Moreover, because the advertisement has already been generated, the costs of this redevelopment present little benefit to either developer or the target web page 24. Additionally, the designer of the target web page 24 may not wish to include an entire resource 36 or web document 30 of the source server 34, but may only wish to include a particular region within the web document 30 or a particular portion of the web document 30 or resource 36. However, embedding techniques and the iframe construct do not permit this usage; the developer of the target web page 24 may specify only the uniform resource identifier (URI) of the resource 36 web document 30 to be embedded or imported, which may be rendered wholly within the target web page 24.

A second set of examples that may illustrate some consequences inherent in the embedding techniques illustrated in the exemplary scenario 10 of FIG. 1 relates to security limitations or violations. In such scenarios, the target server 28 and the source server 34 are often operated by different individuals in different roles (e.g., employees of different organizations), and the individuals operating one of the servers may, intentionally or unintentionally, exploit or misuse the resources of the other server while rendering together the web document 30 of the target server 28 (potentially including various resources 36 provided by the target server 28) and the resources 36 of the source server 34 embedded in the target web page 24. As a first such example, an interpretable script or executable binary provided by the source server 34 may be configured to intercept communication between the user 12 and the target server 28, e.g., by accessing locally stored resources (e.g., cookies) associated with the target server 28 and stored on the computer 14 of the user 12, or vice versa. As a second such example, a resource 36 provided by a source server 34 may exploit the context of rendering within the target web page 24; e.g., a security certificate provided to authenticate the identity of the web document 30 and resources 36 provided by the target server 28 may inappropriately apply also to the resources 36 provided by the source server 34. Such security problems may arise from the generation of the target web page 24 by rendering together the resources 36 of the source server 34 and the web document 30 and resources 36 of the target server 28.

In order to reduce such security concerns, web browsers 18 often implement a cross-domain restriction policy. In accordance with this policy, a resource 36 provided by a server for rendering within a web page may only communicate with the server and access the resources 36 provided by the server, and may neither communicate with another server nor access any resources 36 provided by another server. This restriction is implemented by associating each resource 36 with a domain of the server (e.g., a web domain serving as a base address for all resources 36 provided by the server). When a first resource 36 attempts to contact a server or access a second resource, the web browser 18 compares the domains associated with the first resource 36 and the server or second resource, only permits the interaction if the first resource 36 and the server or second resource belong to the same domain. For example, a maliciously crafted resource executed on a computer 14 of a user 12 may attempt to access banking details of the user 12 by contacting the banking server while impersonating the user 12; by eavesdropping on communication between the user 12 and the banking server; and/or by accessing a cookie or other resource 36 of the banking server that is locally stored on the computer 14 of the user 12. Such intrusion attempts may be obstructed through the implementation of a cross-domain restriction policy, such that the maliciously crafted resource, not belonging to the domain of the banking server, can neither contact the banking server nor access any resources of the banking server stored on the computer 14 of the user 12 or executing within a web browser 18 of the computer 14. Each resource 36 may therefore be isolated from the resources 36 associated with other domains, thereby improving the security and stability of the computer 14.

However, the implementation of a cross-domain restriction policy may create other consequences in the exemplary scenario 10 of FIG. 1. For example, the cross-domain restriction policy may be incomplete or circumvented due to the rendering together of the resources 36 of the source server 34 and the web document 30 and resources 36 of the target server 28. For example, in some embedding arrangements, one of the target server 28 and/or the source server 34 may have to extend a measure of trust to the other by permitting limited interaction, and this trust may be exploited. As one such example, in some embedding scenarios, the target server 28 may have to receive and store a resource 36 from the source server 34 and serve the resource 36 directly to the computer 14 of the user 12, thereby creating an opportunity for the resource 36 to exploit the access to the domain of the target server 28. Conversely, the cross-domain restriction policy may interfere with some legitimate types of interaction that the target server 28 and/or the source server 34 may wish to implement. For example, the target server 28 may wish to permit a first resource 36 rendered in the target web page 24 to interact with a second resource 36 also rendered in the target web page 24. However, if both resources 36 are rendered within the target web page 24, the cross-domain restriction policy may prohibit with such interactions. These and other consequences of the cross-domain restriction policy may therefore interfere with the appearance and functionality of the resources 36 of the target web page 24, due to the rendering together of such resources 36 with the web document 30 of the target server 28 according to the embedding techniques illustrated in the exemplary scenario 10 of FIG. 1.

Figure 3:
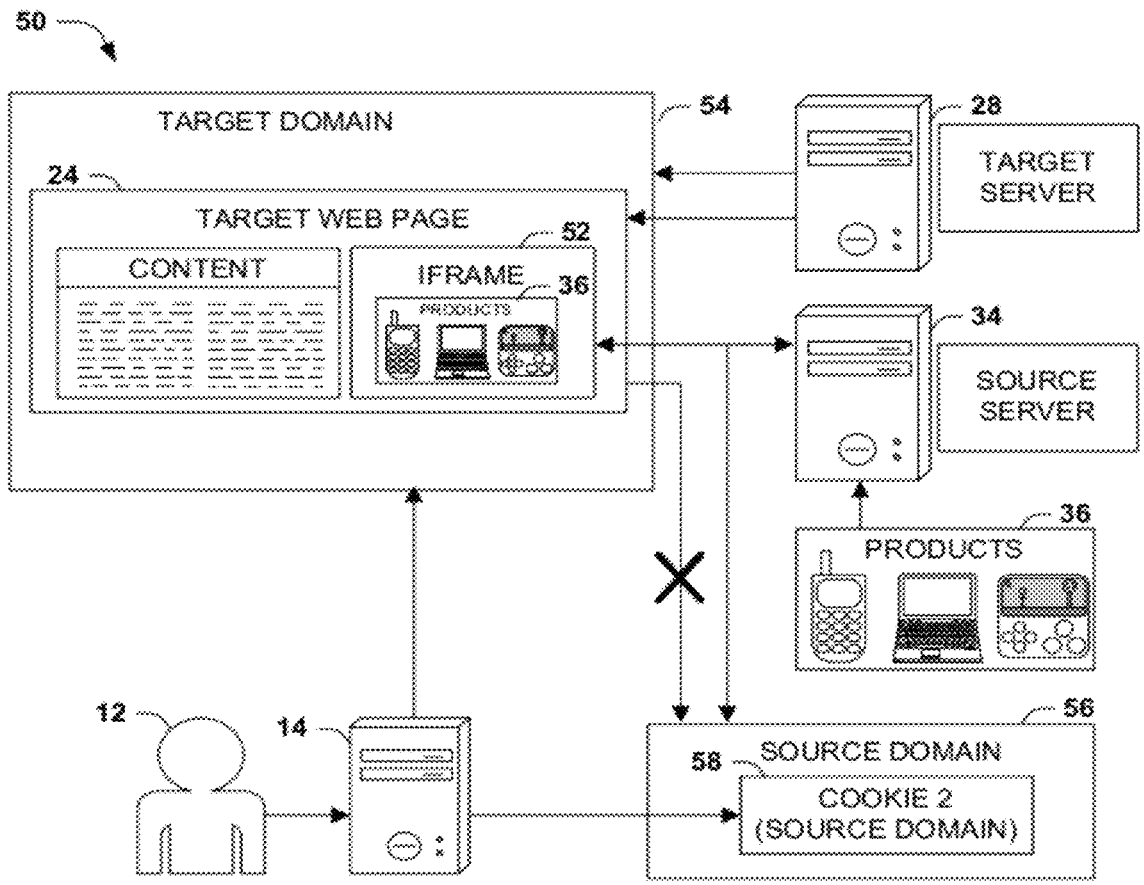
FIG. 3 is an illustration of an exemplary scenario featuring a second possible disadvantage of presenting a resource provided by a source server within an iframe of a target web page provided by a target server.

FIG. 3 presents an exemplary scenario 50 illustrating one consequence that may arise within this set of examples. In this exemplary scenario 50, a user 12 of a computer 14 requests to access a target web page 24 provided by a target server 28 that includes within an iframe 52 one or more resources 36 provided by a source server 34, such as an advertisement 46 for various products available for purchase through the source server 34. The resources 36 of the source server 34 may be associated with and restricted to a source domain 56 (capable of accessing source domain resources 58 stored on the computer 14 of the user 12 that are associated with the source domain 56 of the source server 34). In many cases, because the target web page 24 is not associated with the source domain 56, the target web page 24 may be unable to access the source domain resources 58 and/or communicate with the resource 36 imported and presented within the iframe 52. However, because the iframe 52 and the target web page 24 are rendered together by the web browser 18 as one web page, exploits may and have been devised to circumvent some aspects of the cross-domain restriction policy and permit communication between the target web page 24 and the resources 36 enclosed in the iframe 52.

An additional problem illustrated in the exemplary scenario 50 of FIG. 3 involves the manner of rendering the resource 36 of the source server 34 within the target web page 24. In particular, the entire resource 36 is imported and rendered into the iframe 52; e.g., the entire image hosted by the source server 34 is thereby presented. However, the developer of the target web page 24 and/or the source server 34 may intend only a portion of the resource 36 to appear, such as a visual portion of a web document 30 or a portion or a cropped portion of an image. For example, in the exemplary scenario 50 of FIG. 3, the developer of the target web page 24 may intend only the portion of the image depicting a particular product to appear in the target web page 24, but may only be able to embed or encapsulate in an iframe the entire image comprising all of the images. These and other disadvantages may arise in traditional techniques for embedding or importation of resources 36 in the target web site 24.

Presented herein are techniques for improving the presentation of a target web site 24 including one or more aspects provided by a source server 34. In accordance with these techniques, the target server 28 may provide a target web page 24 including a target region where the aspects provided by the source server 34 are to appear (e.g., an advertising area 44 wherein an advertisement 46 provided by an advertiser may be presented) without embedding resources 36 of the source server 34 in the target web page 24. Rather, the source server 34 may provide a source web page, which may be rendered by the web browser 18 separately from the target web page 24. A particular source region of the source web page may be defined (e.g., a coordinate set bounding an area of the source web page), and the web browser 18 may extract the source region of the source web page and present the source region within the target region of the target web page 24. The extraction may comprise, e.g., cropping the display area of the source web page to the source region, and then displaying this source region atop the target region of the target web page 24. Additionally, the extracted source region continues to operate within the context of the source web page (optionally interacting with other resources 36 included in the source web page, even if such resources 36 are outside of the source region and are not displayed). However, in contrast with the embedding techniques illustrated in the exemplary scenario 10 of FIG. 1, the presentation of the source region extracted from the source web page in the target region of the target web page 24 does not involve embedding any resources 36 of the source server 34 in the target web page 24, and such resources 36 cannot interact with the web document 30 and/or the resources 36 provided by the target server 28, because the web pages are separately rendered, and are as isolated from one another within the web browser 18 as if rendered in separate web browser windows or separate tabs. These techniques therefore sustain the functionality of the resources 36 of the source server 34 as if operating natively on a source web page, while also improving the isolation of such resources 36 from the web document 30 and the resources 36 of the target server 28 comprising the target web page 24.

Figure 4:
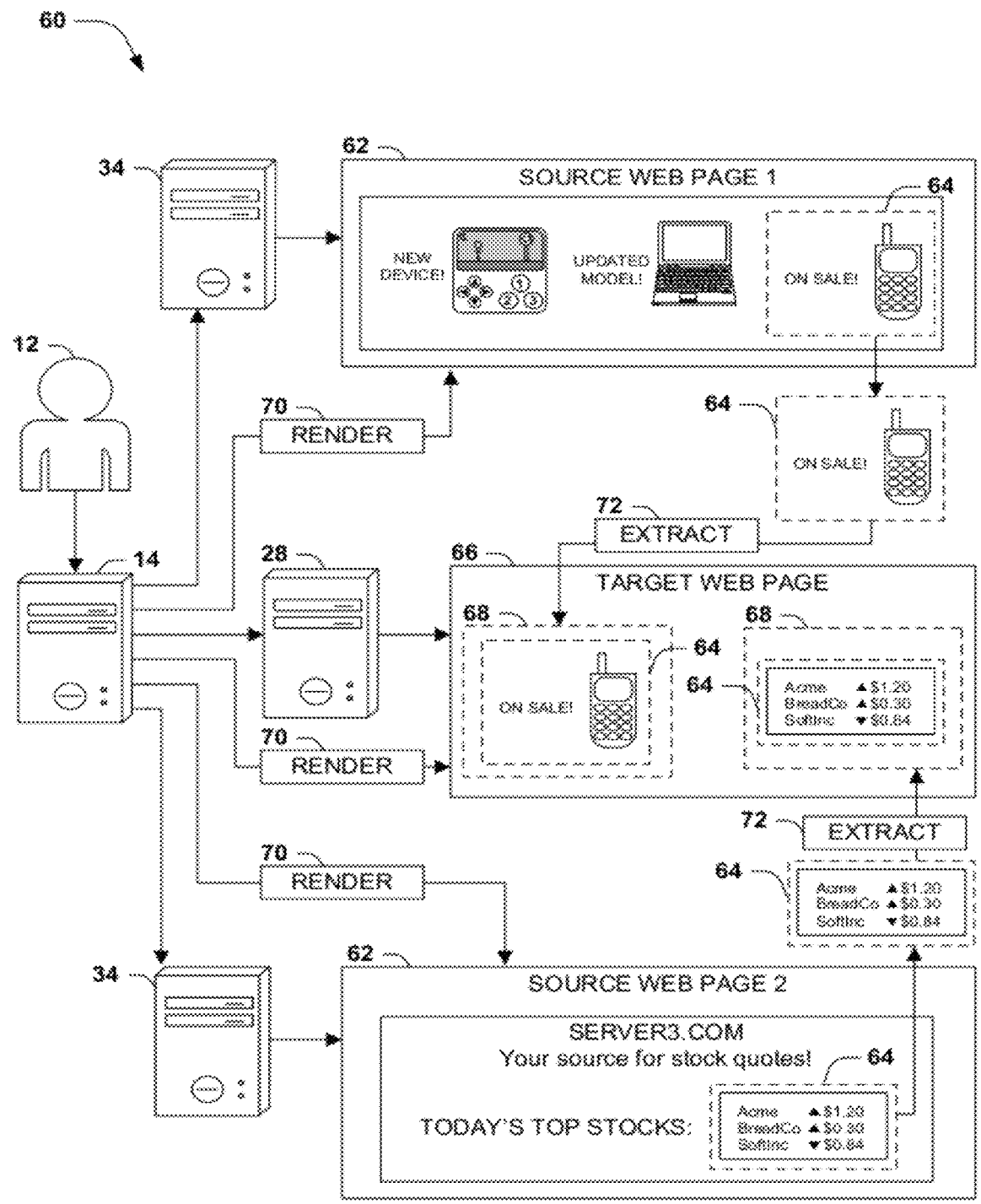
FIG. 4 is an illustration of an exemplary scenario featuring a presentation of a source region of a source web page in a target region of a target web page in accordance with the techniques presented herein.

FIG. 4 presents an exemplary scenario 60 wherein the techniques presented herein may be utilized to present to a user 12 a target web page 66 provided by a target server 28 that includes one or more aspects of a first source server 34 and a second server 34. In this exemplary scenario 60, the user 12 of the computer 14 again requests the target web page 66 provided by the target server 28, which may send to the computer 12, for rendering by a web browser 18, a web document 30 (e.g., a hypertext markup language (HTML) document) specifying various aspects of the target web page 66. This target web page 66 includes a first resource 36 provided by a first source server 34 (e.g., an advertisement provided by an advertiser) and a second resource 36 provided by a second source server 34 (e.g., a stock quote application presenting stock quotes). However, in accordance with the techniques presented herein, the web document 30 does not include references 30 that embed these resources 36. Rather, the first resource 36 is embedded in a first source web page 62 provided by the first source server 34, and the second resource 36 is embedded in a second source web page 62 provided by the second source server 34. These source web pages 62 may be natively provided by the source servers 34 (e.g., a regular web page that is presented to users 12 who visit the website of the source server 34), and/or may be specifically designed for presentation 20 within the target web page 66 of the target server 28. In order to present the target web page 66 to the user 12, the web browser 18 of the computer 14 may first retrieve the target web page 66, may render 70 the target web page 66, and may identify, according to the web document 30, a first target region 68 wherein a first source region 64 is to be presented and a second target region 68 wherein a second source region 64 is to be presented. Accordingly, the web browser 18 may retrieve the first source web page 62 from the first source server 34; render 70 the first source web page 62; and may identify a first source region 64 specified within the first source web page 62. Similarly, the web browser 18 may retrieve the second source web page 62 from the second source server 34; may render the second source web page 62; and may identify a second source region 64 specified within the second source web page 62. The web browser 18 may then extract 72 the first source region 64 (e.g., cropping the rendered first source web page 62 to the boundaries of the first source region 64) and extract 72 the second source region 64, and may present these source regions 64, accordingly, within the first target region 68 and the second target region 68 of the target web page 66. In this manner, the target web page 66 may appear to embed the aspects of the source web pages 62 presented within the source regions 64; however, these aspects are rendered as separate web pages, isolated from the contents of the target web page 66.

The techniques illustrated in the exemplary scenario 60 of FIG. 4 may present some advantages, particularly in comparison with the techniques presented in the exemplary scenario 10 of FIG. 1. As a first example, the specification of a source region 64 may be adjusted in many ways in view of the presentation within a particular target region 68, such as matching the dimensions of the target region 68. As a result, the redevelopment of resources to achieve the adaptation of the source region 64 to fit a target region 68 may be reduced or eliminated, thereby incurring a significant efficiency advantage. Moreover, the target web page 66 may include advertisements and mash-ups may be generated simply by selecting different source regions 64 of the source web page 62 (e.g., by specifying the coordinates bounding any desired area to be included in the target region 68). For example, an advertisement for or portal to the source web page 62 may be included as a source region 64 within the target web page 66 even if the selected area is not an actual advertisement, but simply content presented on the source web page 62. Additionally, the target web page 66 may be able to include several source regions 64 of the source web page 62 within the target web page 66 to create an advertisement or portal to the source web page 66 with a new or adjusted layout, or a mash-up of the content of the source web page 62 with content from the target web page 66 and/or other source web pages 62.

As a second set of advantages, the features of the target web page 66, such as may be specified in the web document 30 and the resources 36 of the target server 28 and other source servers 36, do not affect the presentation of the source region 64. For example, the formatting of text specified in a cascading style sheet (CSS) associated with the target web page 66 does not influence the formatting of text in the source region 64, as it is rendered separately within a source web page 62. Additionally, no features of the configuration of the target web page 66 may affect the functionality of any resources 36 presented within the source region 64; if the source web page 62 function acceptably when natively rendered by a web browser 18 (e.g., when a user 12 visits the source web page 62), these elements also function when extracted and presented within the target region 68 of the target web page 66. Conversely, the properties of the source region 64 cannot affect the formatting, layout, for functionality of any aspect of the target web page 66. For example, if the sizes of elements in the source region 64 differ from the size of the target region 68 (as in the exemplary scenario 40 of FIG. 2), then such differences may affect the appearance within the target region 68 (e.g., only part of an image may appear, and a portion laying outside of the boundaries of the source region 64 may be cropped out), and cannot affect any aspect of the appearance of the target web page 66 outside of the target region 68.

As a third set of advantages presented in the exemplary scenario 60 of FIG. 4, the security issues involved in embedding resources 36 in a target web page 24 and the complexities of the cross-domain restriction policy do not affect the presentation of the source region 64 within the target region 68 of the target web page 66. Rather, the source region 64 operates within the source domain 56 of the source server 34, as it is rendered simply as a source web page 62 served by the source server 34, while the remainder of the target web page 66 is rendered within the target domain 54 associated with the target server 28. According to the security policy of the web browser 18, these different regions are as isolated from each other as separate web pages rendered within different web browser windows or within different web browser tabs. As a result, the source region 64 may be personalized for the user 12 (e.g., including personal content of the user 12, such as account information of the user 12 with the source web page 62, or content that may be of personal interest to the user 12, such as a personalized news feed. Moreover, the source region 64 may be personalized for the user 12 without concern that the target web page 66 may be able to interfere with such personalization due to the mutual isolation of the source region 64 and the target web page 68 as isolated within different renderings of different web pages. These and other advantages may be achieved according to the techniques presented herein.

Figure 5:
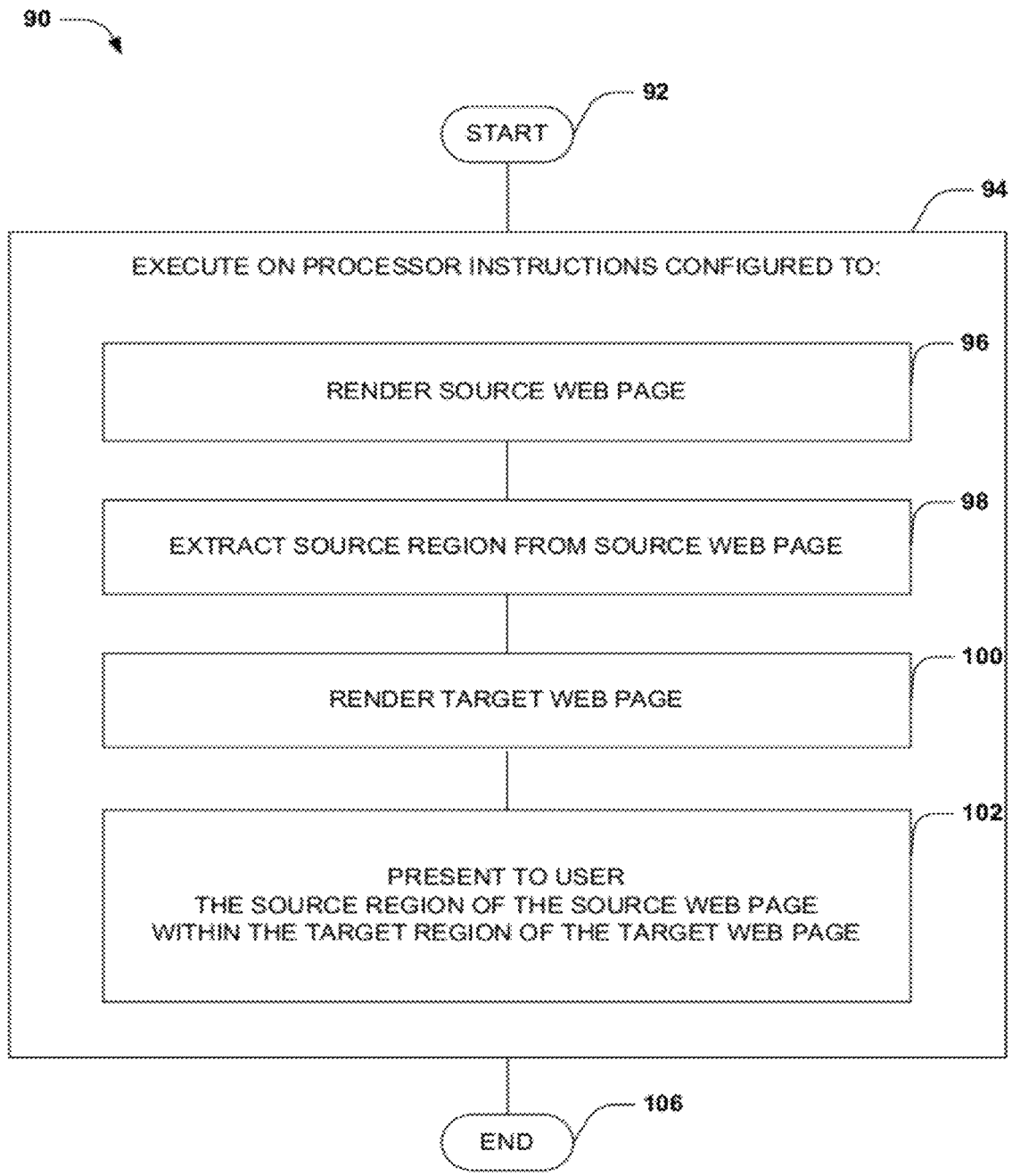
FIG. 5 is a flow chart illustrating an exemplary method of presenting a source region of a source web page in a target region of a target web page.

FIG. 5 presents a first embodiment of these techniques, illustrated as an exemplary method 90 of presenting a source region 64 of a source web page 62 within a target region 68 of a target web page 64. The exemplary method 90 may be implemented, e.g., as a set of software instructions stored in a memory component (e.g., a system memory circuit, a platter of a hard disk drive, a solid state storage device, or a magnetic or optical disc) of the computer 14 of the user 12, that, when executed by a processor of the computer 14, cause the processor to perform the techniques presented herein. The exemplary method 90 begins at 92 and involves executing 94 the instructions on the processor. More specifically, the instructions are configured to render 96 the source web page 62, and extract 98 the source region 64 from the source web page 72. The instructions are also configured to render 100 the target web page 66, and present 102 to the user 12 the source region 64 of the source web page 62 within the target region 68 of the target web page 66. In this manner, the instructions cause the computer 14 to present the source region 64 of the source web page 62 within the target region 68 of the target web page 66, and the exemplary method 90 ends at 106.

Figure 6:
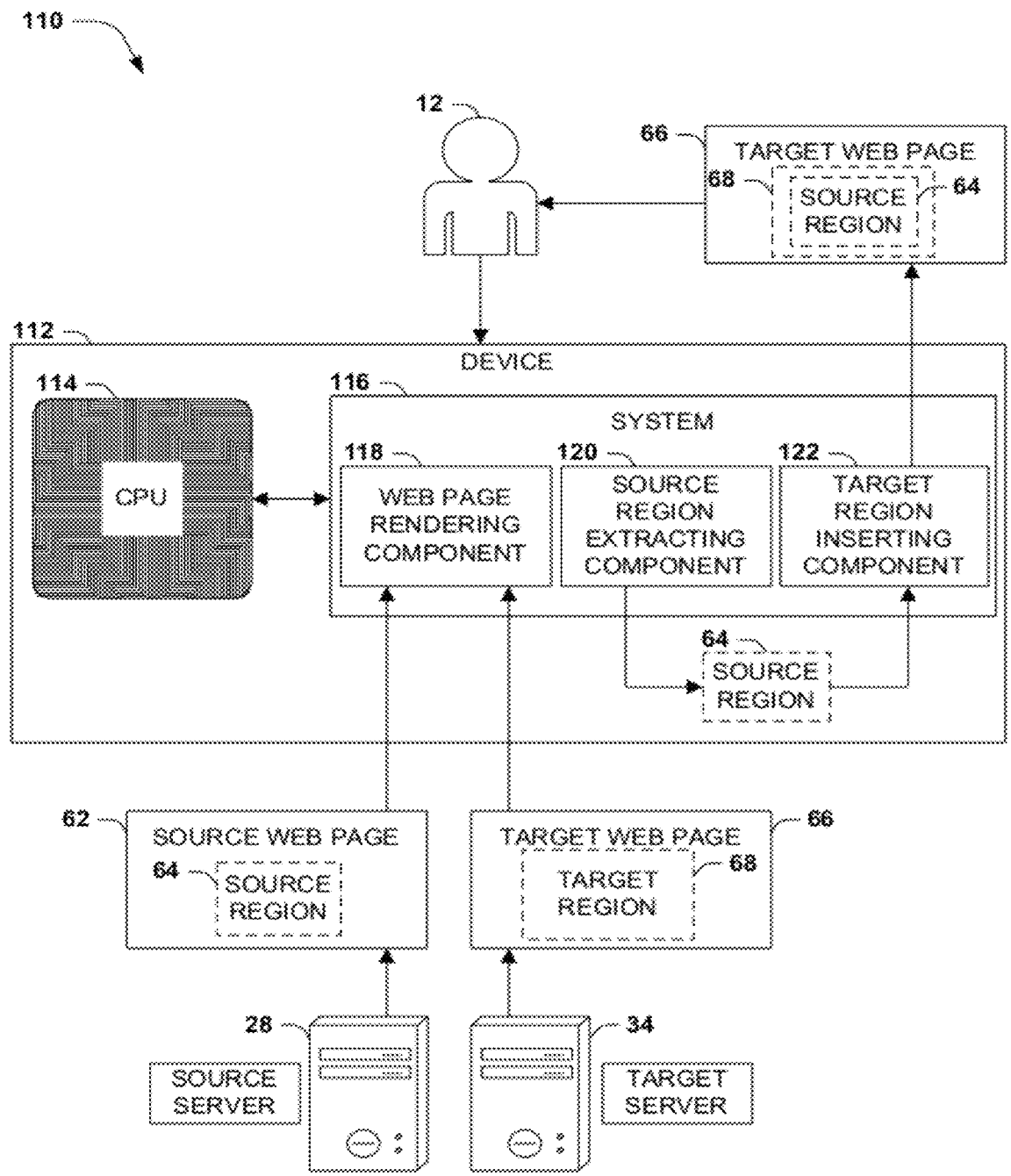
FIG. 6 is a component block diagram illustrating an exemplary system for presenting a source region of a source web page in a target region of a target web page.

FIG. 6 presents a second embodiment of these techniques, illustrated as an exemplary system 116 configured to present a source region 64 of a source web page 62 within a target region 68 of a target web page 64. The exemplary system 116 may be implemented, e.g., as a software architecture, comprising a set of components, each comprising a set of software instructions stored in a memory component (e.g., a system memory circuit, a platter of a hard disk drive, a solid state storage device, or a magnetic or optical disc) of a device 112 that, when executed (concurrently or consecutively) by a processor 114 of the device 112, cause the processor 114 to perform one or more tasks of the techniques presented herein. The exemplary system 116 includes a web page rendering component 118, which is configured to render the source web page 62 and to render the target web page 66. The exemplary system 116 also includes a source region extracting component 120, which is configured to extract the source region 64 from the source web page 62. The exemplary system 116 also includes a target region inserting component 122, which is configured to display the source region 64 of the source web page 62 within the target region 68 of the target web page 66. In this manner, the exemplary system 116 causes the processor 114 of the device 112 to present the source region 64 of the source web page 62 within the target region 68 of the target web page 66 in accordance with the techniques presented herein.

Still another embodiment involves a computer-readable medium comprising processor-executable instructions configured to apply the techniques presented herein. Such computer-readable media may include, e.g., computer-readable storage media involving a tangible device, such as a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a CD-R, DVD-R, or floppy disc), encoding a set of computer-readable instructions that, when executed by a processor of a device, cause the device to implement the techniques presented herein. Such computer-readable media may also include (as a class of technologies that are distinct from computer-readable storage media) various types of communications media, such as a signal that may be propagated through various physical phenomena (e.g., an electromagnetic signal, a sound wave signal, or an optical signal) and in various wired scenarios (e.g., via an Ethernet or fiber optic cable) and/or wireless scenarios (e.g., a wireless local area network (WLAN) such as WiFi, a personal area network (PAN) such as Bluetooth, or a cellular or radio network), and which encodes a set of computer-readable instructions that, when executed by a processor of a device, cause the device to implement the techniques presented herein.

Figure 7:
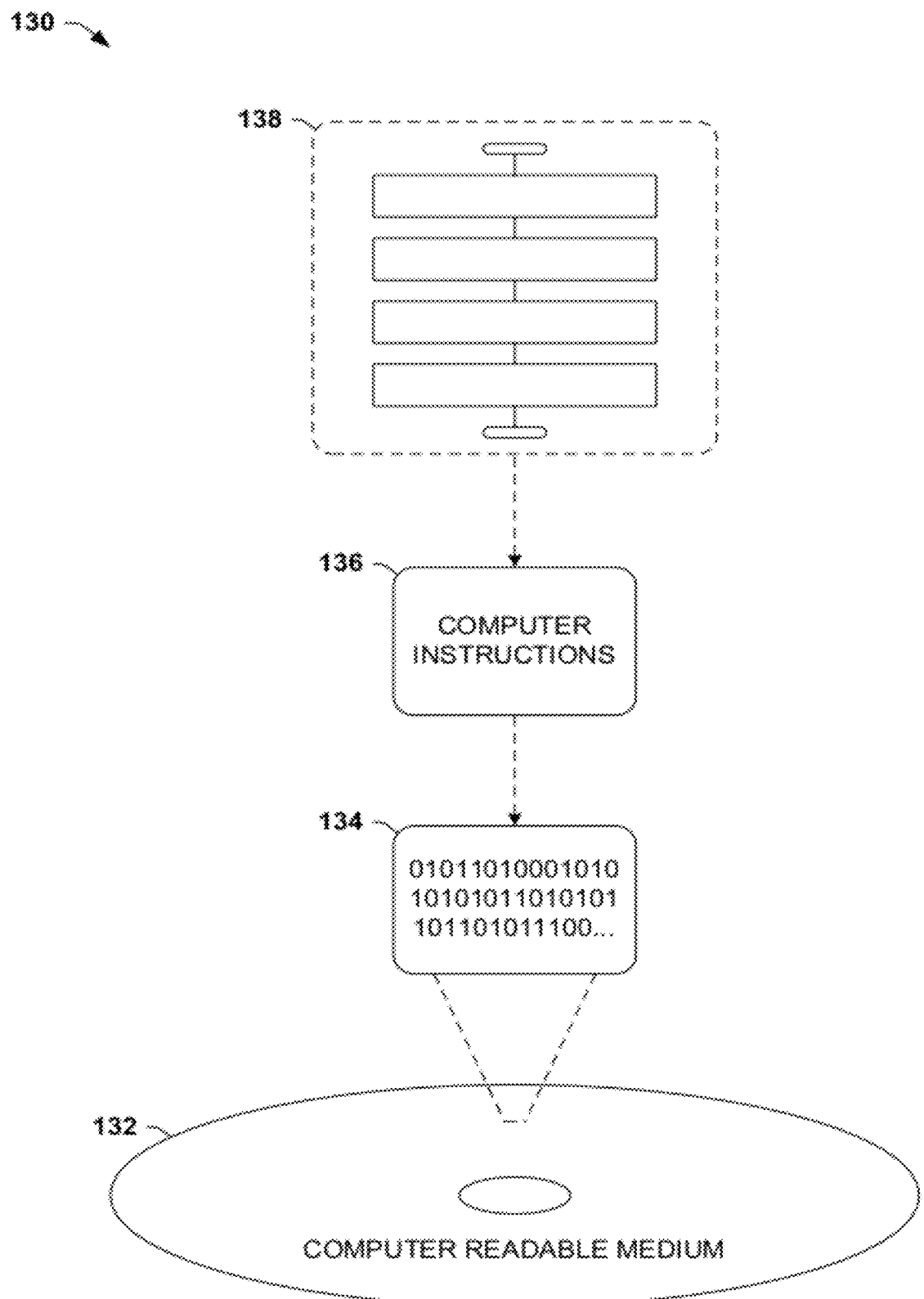
FIG. 7 is an illustration of an exemplary computer-readable medium comprising processor-executable instructions configured to embody one or more of the provisions set forth herein.

An exemplary computer-readable medium that may be devised in these ways is illustrated in FIG. 7, wherein the implementation 130 comprises a computer-readable medium 132 (e.g., a CD-R, DVD-R, or a platter of a hard disk drive), on which is encoded computer-readable data 134. This computer-readable data 134 in turn comprises a set of computer instructions 136 configured to operate according to the principles set forth herein. In one such embodiment, the processor-executable instructions 136 may be configured to perform a method of presenting a source region of a source web page in a target region of a target web page, such as the exemplary method 90 of FIG. 5. In another such embodiment, the processor-executable instructions 136 may be configured to implement a system for presenting a source region of a source web page in a target region of a target web page, such as the exemplary system 116 of FIG. 6. Some embodiments of this computer-readable medium may comprise a non-transitory computer-readable storage medium (e.g., a hard disk drive, an optical disc, or a flash memory device) that is configured to store processor-executable instructions configured in this manner. Many such computer-readable media may be devised by those of ordinary skill in the art that are configured to operate in accordance with the techniques presented herein.

The techniques discussed herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments (e.g., the exemplary method 90 of FIG. 5 and the exemplary system 116 of FIG. 6) to confer individual and/or synergistic advantages upon such embodiments.

A first aspect that may vary among embodiments of these techniques relates to the scenarios wherein such techniques may be utilized. As a first variation, these techniques may be utilized to present to a user 12 many types of web sites and resources 36 included therein, wherein elements of a source web page 62 are to appear in a target web page 66, such as text, rendered documents, images, audio or video recordings, or applications. Additionally, these scenarios may be based on an explicit or implicit cooperation of the target server 28 and the source server 34, such as an advertising relationship between an advertiser who wishes to present some advertisements 46 within an advertising space 44 of an advertising-supported target web page 24. Alternatively, these techniques may be used if the target server 28 and the source server 34 do not cooperate, and even if the source server 34 does not know about or consent to the inclusion of the source region 64 in the target region 68 of the target web page 66, e.g., where the target web page 66 comprises a "mashup" including content of the source web page 62, and optionally of several source web pages 62, to create a new set of content. Those of ordinary skill in the art may devise many such scenarios wherein the techniques presented herein may be utilized.

A second aspect that may vary among embodiments of these techniques relates to the manner of detecting the source region 64 of the source web page 62 and/or the target region 68 of the target web page 66. As a first example, the target web page 66 may identify the target region 68, e.g. as a coordinate set bounding the target region 68 within the target web page 66 (e.g., "coordinates (50, 50) to (100, 200)"), or as a region having particular dimensions (e.g., "an area rendered within a position in the flow layout of the target web page having a size of 100 pixels×200 pixels"). As a second example, the source region 64 of the source web page 62 may be similarly defined by the source web page 62 (e.g., "the source region 64 defined by these coordinates within the source web page 62 may be extracted for inclusion in target web pages 66"), or may be defined by the target web page 66 (e.g., "the source region 64 of the source web page 62 defined by these coordinates is to be extracted and included in this target web page 66"). The target web page 66 may also specify a particular type of container wherein the source region 64 may be rendered, e.g., an iframe that may serve as a placeholder for the source region 64 within the layout of the target web page 66. Those of ordinary skill in the art may devise many ways of indicating the presence and areas defining the source region 64 and/or the target region 68 while implementing the techniques presented herein.

A third aspect that may vary among embodiments of these techniques relates to the manner of extracting the source region 64 of the source web page 62 and presenting the source region 64 within the target region 68 of the target web page 66. As a first variation, the source region 64 may be extracted in many ways, such as by rendering the source web page 62 in a non-visible manner, selecting a visible portion of the rendering of the source web page 62 matching only the source region 64, and positioning the rendering of the source web page 62 so that the source region 64 matches the target region 68 of the target web page 66. In this example, the entire source web page 62 is logically rendered, and all resources 36 that are embedded in the source web page 62 are processed so that any resources 36 embedded within the source region 64 may interact with resources 36 embedded in the source web page 62 outside of the source region 64 as if the entire source web page 62 were visible, even though only the source region 64 is visible to the user 12. Alternatively, an embodiment may generate an extracted representation of the source region 64 (e.g., a snapshot such as a screen capture or a video recording), and may present the extracted representation within the target region 68 of the target web page 66.

As a second variation of this third aspect, a source region 64 of a source web page 62 may be positioned within a target region 68 of a target web page 66 in many ways. If the properties of the target region 68 (e.g., the shape, size, and resolution) match the properties of the source region 64, the source region 64 may simply be presented atop the target region 68. However, the one or more properties of the target region 68 may differ from those of the source region 64. As a first example of this second variation, the source region 64 may simply be positioned over the target region 68 (e.g., matching the centers or a particular corner of the source region 64 and the target region 68), and any portion of the source region 64 not fitting within the target region 68 may simply be cropped and/or hidden. This hiding may lead to undesirable consequences (e.g., showing only a portion of the contents of the source region 64), but may preserve the layout of the target web page 66 outside of the target region 68. Conversely, if the source region 64 is smaller than the target region 68, the source region 64 may simply be positioned (e.g., centered) within the target region 68, and the remainder of the target region 68 may be presented without adjustment (e.g., using a background color or image specified by the target web page 66).

However, in other examples of this second variation, the source region 64 may be adjusted in various ways. In keeping with the principles of the techniques presented herein, it may be desirable to adjust the source region 64 in a manner that does not alter the content and/or functionality of the source region 64 (e.g., disproportionate scaling of the source region 64 that may alter and distort the dimensions of the content presented therein). However, some alterations may be acceptable and anticipated variations in the rendering of the source web page 62, and that the source web page 62 is designed to utilize while rendering. For example, a user 12 of a web browser 18 may select certain properties of the web browser, such as the dimensions of the browser window, a zoom level of the content presented within the browser window, and a general adjustment of the size of text rendered within the web browser 18 (e.g., large text vs. small text). Many web pages, including the source web page 62, may be designed to be rendered acceptably for many sets of such properties. Accordingly, it may be acceptable to specify or adjust these same properties in the rendering of the source web page 62 in order to extract the source region 64 for presentation within a target region 68.

Figure 8:
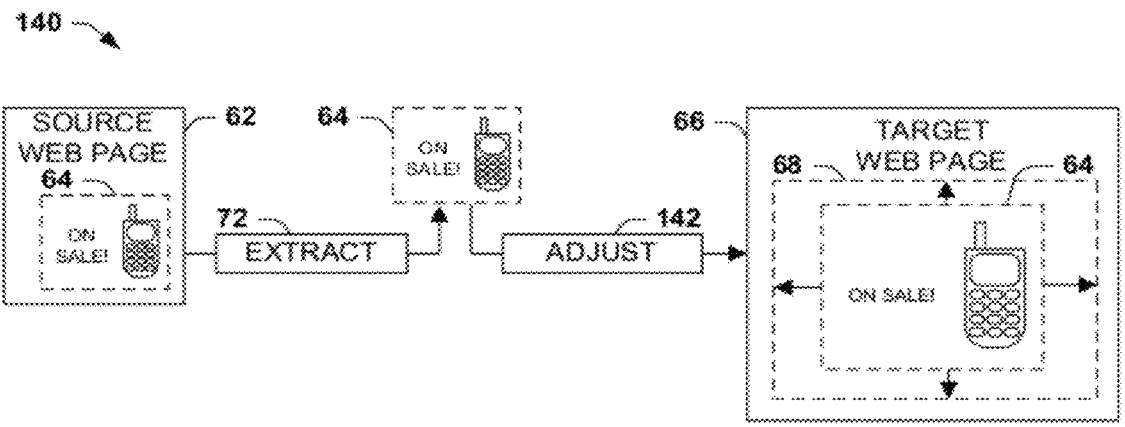
FIG. 8 is an illustration of an exemplary scenario featuring a first exemplary source region of a source web page presented in a target region of a target web page.

FIG. 8 presents a first exemplary scenario 140 of an adjustment of a source region 64 of a source web page 62 to match a target region 68 of a target web page 66, without altering the content and/or functionality of the source region 64. In this exemplary scenario 140, a source web page 62 includes a source region 64 that is to be extracted and presented within a target region 68 of a target web page 66. However, each region may have a set of values for one or more region dimensions (e.g., height, width, shape, and color depth), and the source region dimension values of the source region 64 may not match the target region dimension values of the target region 68 for the same region dimensions. For example, the source region 64 may have smaller values for the height and width than the target region 68. Accordingly, an embodiment of these techniques may extract 72 the source region 64, and in order to present the source region 64 within the target region 68, may adjust 142 the source region 64. It may not be acceptable to adjust 142 the source region 64 in some ways (e.g., a disproportionate scaling that alters the aspect ratio of the source region 64, resulting in an undesirably stretched or compressed presentation of the source region 64), since such operations are not typically valid for or supported by the source web page 62. However, the embodiment may adjust 142 the source region 64 in ways that are acceptable, e.g., a proportionate scaling, which may be equivalent to a user 12 adjusting a zoom level of a web browser 18 wherein the source web page 62 may be rendered. Because the source web page 62 and the source region 64 may already support such adjustments, it may be valid to perform such adjustments in order to adjust the 142 the source region 64 to match the target region 68.

Figure 9:
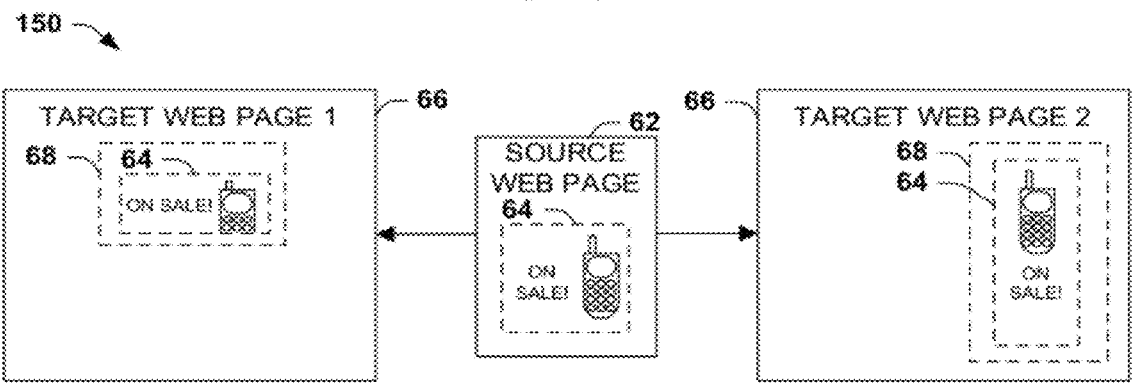
FIG. 9 is an illustration of an exemplary scenario featuring a second exemplary source region of a source web page presented in a target region of a target web page.

FIG. 9 presents a second exemplary scenario 150 of an adjustment of a source region 64 of a source web page 62 to match a target region 68 of a target web page 66. In this exemplary scenario 150, the source region 64 may adjust itself in order to match the target region 68. Thus, the source region 64 may be presented with a source region presentation when it is rendered natively within the source web page 62, and a target region presentation when rendered within a target region 68 of a target web page 66, where the target region presentation matches the region dimensions of the particular target region 68. As a first such example, the source server 34 may include several versions of the source region 64 (e.g., several versions of an image in various dimensions) and/or may generate a version of the source region 64 in an ad hoc manner, and may therefore be capable of providing a suitable version of the source region 64 for a target region 68 having particular region dimensions (e.g., if such region dimensions are provided as parameters in the uniform resource identifier (URI) in the request 26 for the source web page 62). As a second such example, the source region 64 may comprise an active resource, such as a script or executable, that may accept parameters regarding the region dimensions of the target region 68, and may be capable of adjusting the layout and positioning of elements visible within the source region 64 according to such region dimensions. Accordingly, when the source web page 62 is presented within a first target region 68 of a first target web page 66 having a wide and short aspect ratio (e.g., a top banner or bottom banner of the target web page 66), the source server 34 and/or a resource 36 within the source region 64 may adjust the content of the source region 64 to suit a wide and short aspect ratio. Similarly, when the source web page 62 is presented within a second target region 68 of a second target web page 66 having a thin and tall aspect ratio (e.g., a side banner of the target web page 66), the source server 34 and/or a resource 36 within the source region 64 may adjust the content of the source region 64 to suit a thin and tall aspect ratio.

Figure 10:
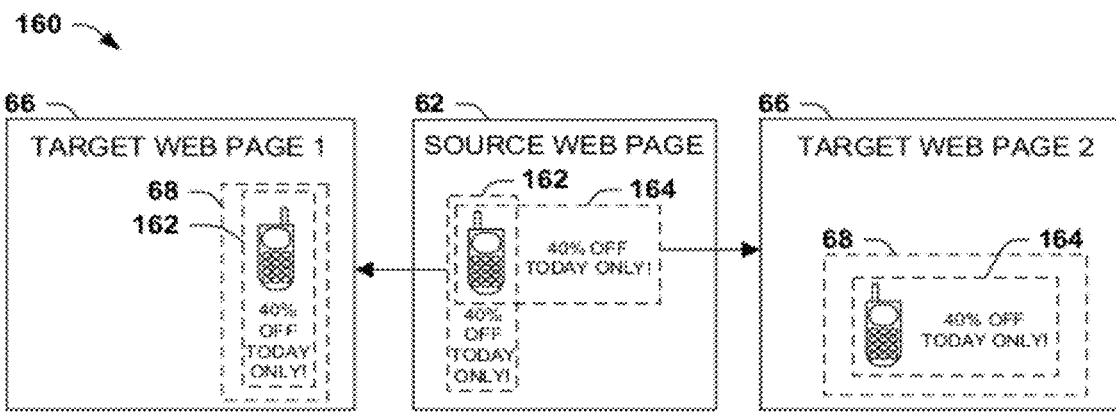
FIG. 10 is an illustration of an exemplary scenario featuring a third exemplary source region of a source web page presented in a target region of a target web page.

FIG. 10 presents a third exemplary scenario 160 of an adjustment of a source region 64 of a source web page 62 to match a target region 68 of a target web page 66. In this exemplary scenario 160, the source region 64 of the source web page 62 is configured to present a source region presentation that, when rendered within a first target region 68 of a first target web page 66, matches the first target region 68; but when rendered within a second target region 68 of a second target web page 66 (that is different from the first target region 68), matches the second target region 68. Thus, no adjustment of the content of the source region 36 is involved to match the region dimensions of the target region 68; rather, the location of the source region 64 is adjusted to select a suitable source region 64 to match the target region 68. For example, as illustrated in the exemplary scenario 160 of FIG. 10, the source web page 62 includes an advertisement that redundantly displays portions of the advertisement along a horizontal axis and a vertical axis. In order to extract the source region 64 for a wide and short target region 68 (e.g., a top or bottom banner of a target web page 66), a first source region 64 may be selected that includes the horizontally arrayed content of the advertisement; and in order to extract the source region 64 for a thin and tall target region 68 (e.g., a side banner of a target web page 66), a second source region 64 may be selected that includes the vertically arrayed content of the advertisement. Additional variations may also be included; e.g., the source web page 62 may include supplemental content further aligned along the horizontal and/or vertical axis that may be included in a source region 64 matching a longer or taller target region 68. As another example of this technique (not illustrated), a first target web page 66 may have a color scheme or background having a first color, while a second target web page 66 may have a color scheme or background having a second color. The source web page 62 may therefore include content within an outward gradient that shades from the first color the second color, and may be rendered into a target region 68 of a target web page 66 by resizing the source region 64 such that the color of the gradient at the edges of the source region 64 matches the color of the target web page 66. In this manner, the source web page 62 may be inherently suitable for several variations of target regions 68. Those of ordinary skill in the art may devise many ways of adjusting a source web page 62 to match a source region 64 to a target region 68 of a target web page 66 while implementing the techniques presented herein.

A fourth aspect that may vary among embodiments of these techniques relates to domain restrictions that may affect the functionality of resources 36 presented in the source region 64 (or other portions of the source web page 62) when presented in the target region 68 of the target web page 66. In general, because the source web page 62 is served from the source server 34 and rendered accordingly, a cross-domain restriction policy implemented by a web browser 18 may associate and restrict the source web page 62 with the source domain 56 associated with the source server 34. Thus, even though the target web page 66 is restricted to a target domain 54 and the source region 62 is presented within the target region 68 of the target web page 66, the resources 36 of the source region 64 (and the other resources 36 included in the source web page 62) are nevertheless associated with a source domain 56 associated with a source server 34. Therefore, the web browser 18 may allow the resources 36 of the source web page 62 to communicate with the source server 34 and to access any other resources 36 also associated with the source domain 56 (including any locally stored source domain resources (e.g., cookies) stored on the computer 14 of the user 12), but may otherwise isolate the source web page 62, such that the resources 36 may neither communicate with any other source server 34 nor the target server 28 access resources 36 associated with any other domain. Additionally, the cross-domain restriction policy may also prevent any resources 36 not associated with the source domain 56 (e.g., other resources 36 operating within the target web page 64) from contacting the resources 36 of the source web page 32, including any locally stored source domain resources (e.g., cookies) associated with the source domain 56, and from contacting the source server 34. These restrictions may be stronger and more consistent, and therefore less vulnerable to circumvention, than those applied to the resources 36 embedded in the target web page 24 in the exemplary scenario 50 of FIG. 3. Additionally, the cross-domain restriction policy may provide less interference into some operations of the resources 38 of the source web page 62, since the entire source web page 62 is now served from the source server 34 and is therefore associated with the source domain 56.

A particular use of this cross-domain isolation of locally stored source domain resources may arise in scenarios featuring an association of the user 12 with the source server 34, e.g., an account, identity, transaction, or personally identifying information of the user 12 that has been shared with the source server 34. The source server 34 may often utilize this information to identify the user 12 in order to personalize the source web page 62 when presented to the user 12 (e.g., by including in the source web page 62 information about the account of the user 12, such as advertisements for related products and services, or the interests and settings of the user 12, such as a selected layout of the source web page 62 that the user 12 has previously selected). In particular, the source web page 62 may store some information as locally store source domain resources, such as the username or account number of the user 12 on the source web page 62, and when the user 12 requests to view the source web page 62, may access such resources in order to identify the user 12 and personalize the source web page 62. Moreover, as a result of the techniques presented herein, the source server 34 may extend this personalization into the rendering of the source region 64 presented in the target web page 68. This extension may occur without concern that the target web page 66 may interfere with the locally stored source domain resources or even detect the personalization, because the source web page 62 is rendered as a completely different web page from the target web page 66, despite the presentation of the source region 64 within the target region 66.

Several additional variations in this restriction may present some additional features in view of the restrictions of the cross-domain restriction policy of the web browser 18. As a first variation, a target web page 66 may include a second target region 68, where a second source region 64 of the source web page 62 may be presented (e.g., both a top banner and a bottom banner presented by the source server 34, and extracted from different source regions 64 of the same or different source web pages 62). However, a developer of the first source region 64 and the second source region 64 may seek to enable the resources 36 presented in these source regions 64 to communicate, e.g., in order to synchronize content, the timing of animations, or responses to user interactions by the user 12. This intercommunication may be achieved in various ways. As a first example of this first variation, if the web browser 18 recognizes that these source regions 64 are extracted from the same source web page 62, the web browser 18 may render the source web page 62 only once, and may therefore extract both source regions 64 from the same rendered instance of the source web page 62. Because these resources 36 rendered into the same instance of the source web page 62 (and are restricted to the same source domain 56), the resources 56 may be able to communicate directly with one another, e.g., through Javascript calls referencing each other. (Additionally, this example presents an improved efficiency over rendering two separate instances of the same source web page 62 and extracting different source regions 64 from different instances.)

This intercommunication may not be as easily achievable if the web browser 18 does not render the source regions 64 into the same instance of the source web page 62. However, intercommunication between the resources 36 of a first source region 64 and a second source region 64 may still be achievable through other examples of this first variation. As a second such example, because the resources 36 in both source regions 64 are associated with the same source domain 56, the resources 36 may communicate through the source server 34. For example, a first resource 36 in the first source region 64 may send a communication to the source server 34 for delivery to a resource 36 in the second source region 64; and a second resource 36 in the second source region 64 may receive messages from the source server 34 (e.g., in a push or pull manner), and may therefore receive the message from the first resource 36. As a third such example, the resources 36 may communicate through source domain resources (e.g., cookies) stored on the computer 14 of the user 12. For example, a first resource 36 in the first source region 64 may store a communication on the computer 14 within a source domain resource, and a second resource 36 in the second source region 64 may retrieve the source domain resource to receive the communication from the first resource 36.

Figure 11:
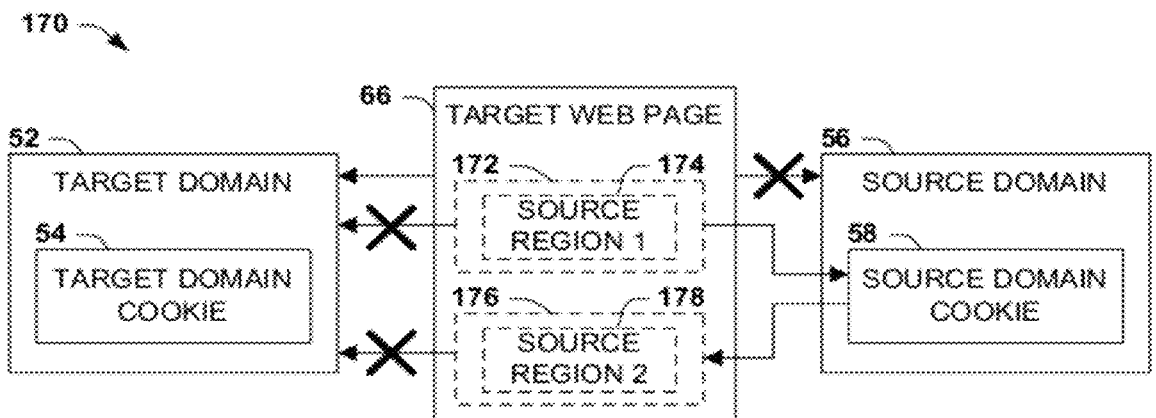
FIG. 11 is an illustration of an exemplary scenario featuring a source region of a source web page presented in a target region of a target web page, wherein the source region and the target are respectively restricted to a source domain and a target domain.

FIG. 11 presents an illustration of an exemplary scenario 170 depicting this type of communication. In this exemplary scenario 170, a target web page 66 includes a first target region 172 wherein a first source region 174 (served from a particular source server 34) is presented, and a second source region 176 wherein a second source region 178 (served from the same source server 34) is presented. The target web page 66 is associated with and restricted to a target domain 54, and may access target domain resources 54 (such as cookies) that are locally stored on the computer 14 of the user 12. However, the resources 36 within the first source region 174 and the second source region 178, despite appearing within the target web page 62, are associated with a source domain 56. Accordingly, a first resource 36 within the first source region 174 may store a source domain resource 58 (e.g., a cookie) on the computer 14 of the user 12, and a second resource 36 within the second source region 178 may retrieve the source domain resource 58 in order to communicate with the first resource 36. In this manner, the resources 36 presented within different source regions 64 of a source web page 62, even if isolated from direct communication, may indirectly communicate in accordance with the cross-domain restriction policy of the web browser 18. Additionally, this communication cannot be intercepted by any resources 36 of the target web page 66, which are associated with the target domain 54 and are therefore restricted by the cross-domain restriction policy from accessing the locally stored source domain resources 58.

As a second variation of this fourth aspect, the cross-domain restriction policy of the web browser 18 may be relevant to user interactions of the user 12 with one or more resources 36 presented in the source region 64. As a first example of this second variation, because the resources 36 of the source region 64 are associated with the source domain 56 associated with the source server 34, the resources 36 may be permitted to notify the source server 34 of the user interaction, and optionally, may utilize a source server response received from the source server 34 to update the source region 64.

As a second example of this second variation, the user interaction may result in a navigation to a different web page. For example, the user 12 may click on a hyperlink presented within a source region 64, or the source region 64 may respond to the user interaction (e.g., a clicking of a button) by sending the user 12 to a second source web page 62 provided by the source server 34. For example, an advertisement for a product may encourage the user 12 to click on the advertisement to visit another source web page 62 that fully describes the product or includes a sales form. However, due to the isolation of the source region 64 form the rest of the target web page 66, the source region 64 may be unable to achieve this navigation by navigating away from the target web page 66, nor in a "pop-over" manner (obstructing a portion of the target web page 66 by exceeding the boundaries of the target region 68). Instead, in a first such example, the navigation may occur within the source region 64, such that the source region 64 presents the second source web page. In a second such example, where the target page 66 is presented in a first web page interface (e.g., a web browser window presented on the display component 16 of the computer 14, or a tab within a web browser 18), the navigation may cause the second source web page 62 to be presented in a different web page interface. Accordingly, an embodiment of these techniques may be configured to, upon receiving the user interaction from the user 12 with the source region 64, instantiate a second web page interface (e.g., a new web browser window, or a new tab within the web browser 18), and cause the web browser 18 to render the second source web page 62 and present the second source web page 62 to the user 12 within the second web page interface.

As a third example of this second variation, in some scenarios, a tracking server may be provided to track the user interactions of respective users 12 with the resources 36 presented in a source region 64. For example, an advertising agency may be configured to track the user interactions of a user 12 with an advertisement provided by a client, and may utilize the information to provide advertising revenue to the target server 28 and/or to bill the clients for the advertising service. Accordingly, the resources 36 of the source region 64 may be configured to notify the tracking server of user interactions received from respective users 12. However, the association of the resources 36 of the source region 64 with the source domain 56 may interfere with attempts to track the user interactions of the user 12. Because of the cross-domain restriction policy, the resources 36 within the source region 64 may be permitted to communicate only with the source server 34, and not with the tracking server.

Figure 12:
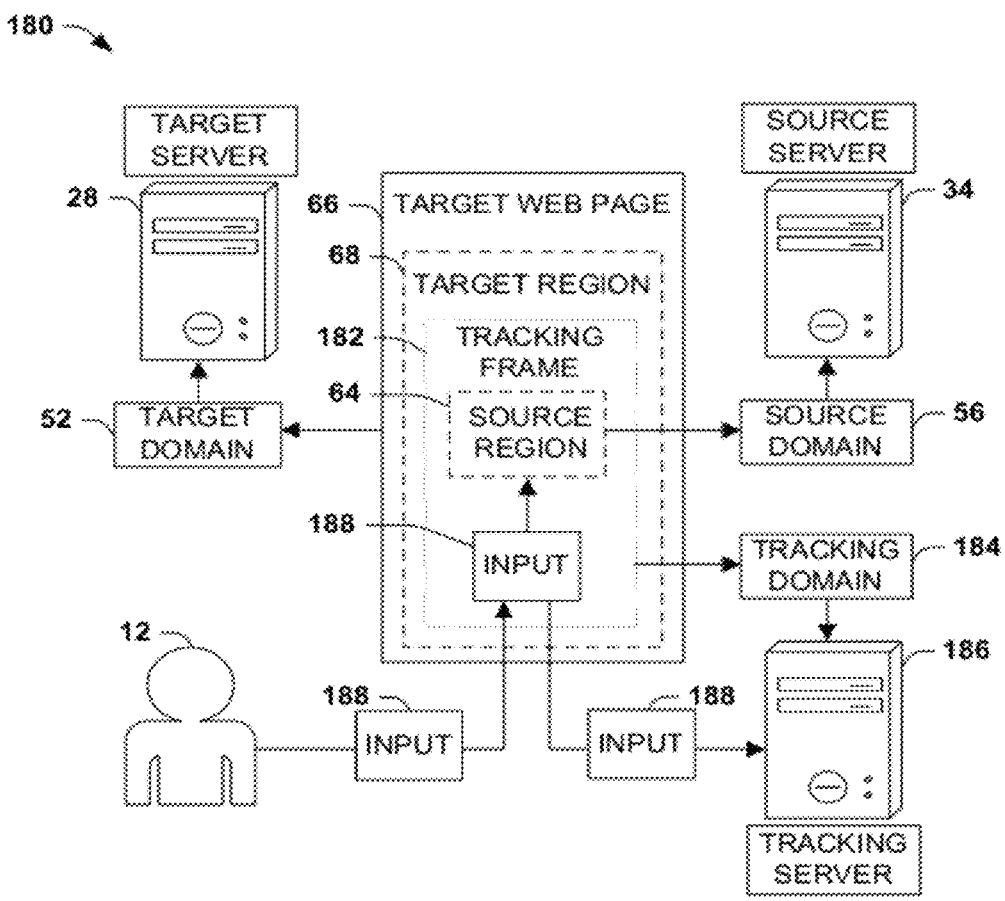
FIG. 12 is an illustration of an exemplary scenario featuring a user interaction with a source region presented in a target region of a target web page that is tracked by a tracking server using a tracking frame.

FIG. 12 presents an illustration of an exemplary scenario 180 featuring one technique for achieving this tracking in view of the cross-domain restriction policy. In this exemplary scenario 180, a target web page 66 served from a target server 28 (and therefore restricted to a target domain 54) may include a target region 68, wherein a source region 64 extracted from a source web page 62 (served by a source server 34, and therefore restricted to a source domain 56) is presented. The user 12 may direct a user interaction 188 to the resources 36 presented in the source region 64, e.g., by clicking within the target region 68. A tracking server 186 may be provided to track the user interaction 188, but may be unable to communicate directly with the source region 64 to receive a notification of the user interaction 188. Instead, the tracking server may provide a tracking frame 182, which may be comprise a hidden control positioned over the target region 38 and configured to receive user interactions directed by the user 12 to the resources 36 of the source region 64. Because the tracking frame 182 is served by the tracking server 186, the tracking frame 182 may be associated with the tracking domain 184 of the tracking server 186, and may therefore be permitted to communicate with the tracking server 186 in accordance with the cross-domain restriction policy of the web browser 18. For example, the tracking frame 182 may receive the user interaction 188 from the user 12, and may notify the tracking server 186 of the user interaction 188. The tracking frame 182 may then propagate the interaction into the target region 68 of the target web page 66, thereby allowing the user interaction 188 to reach the resources 36 presented in the source region 64. Those of ordinary skill in the art may devise many ways of configuring features to respect the cross-domain restriction policies of the web browser 18 while implementing the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 13:
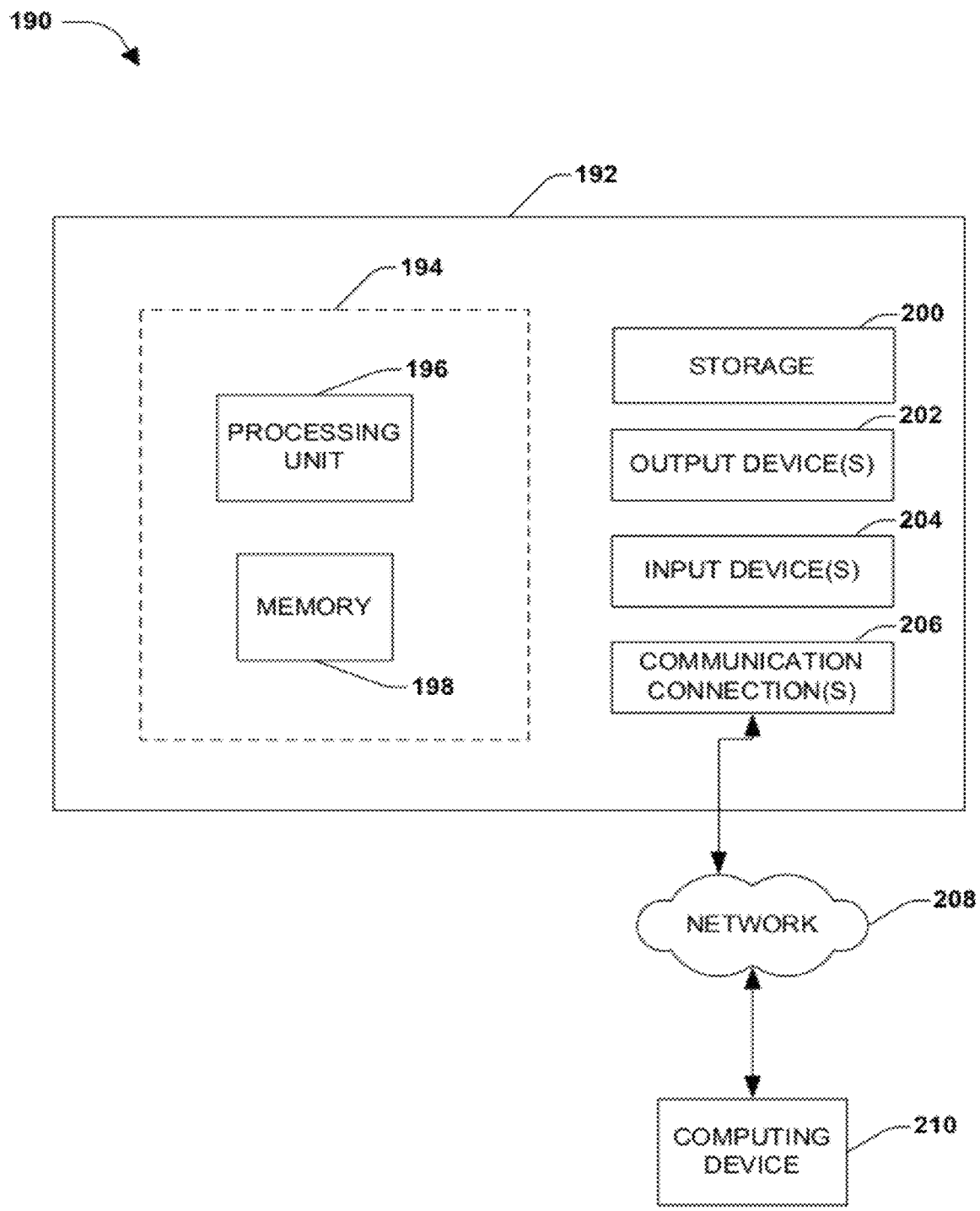
FIG. 13 illustrates an exemplary computing environment wherein one or more of the provisions set forth herein may be implemented.

FIG. 13 and the following discussion provide a brief, general description of a suitable computing environment to implement embodiments of one or more of the provisions set forth herein. The operating environment of FIG. 13 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 13 illustrates an example of a system 190 comprising a computing device 192 configured to implement one or more embodiments provided herein. In one configuration, computing device 192 includes at least one processing unit 196 and memory 198. Depending on the exact configuration and type of computing device, memory 198 may be volatile (such as RAM, for example), non-volatile (such as ROM, flash memory, etc., for example) or some combination of the two. This configuration is illustrated in FIG. 13 by dashed line 194.

In other embodiments, device 192 may include additional features and/or functionality. For example, device 192 may also include additional storage (e.g., removable and/or non-removable) including, but not limited to, magnetic storage, optical storage, and the like. Such additional storage is illustrated in FIG. 13 by storage 200. In one embodiment, computer readable instructions to implement one or more embodiments provided herein may be in storage 200. Storage 200 may also store other computer readable instructions to implement an operating system, an application program, and the like. Computer readable instructions may be loaded in memory 198 for execution by processing unit 196, for example.

The term "computer readable media" as used herein includes computer storage media. Computer storage media includes volatile and nonvolatile, removable and non-removable media implemented in any method or technology for storage of information such as computer readable instructions or other data. Memory 198 and storage 200 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 192. Any such computer storage media may be part of device 192.

Device 192 may also include communication connection(s) 206 that allows device 192 to communicate with other devices. Communication connection(s) 206 may include, but is not limited to, a modem, a Network Interface Card (NIC), an integrated network interface, a radio frequency transmitter/receiver, an infrared port, a USB connection, or other interfaces for connecting computing device 192 to other computing devices. Communication connection(s)

206 may include a wired connection or a wireless connection. Communication connection(s) 206 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 192 may include input device(s) 204 such as keyboard, mouse, pen, voice input device, touch input device, infrared cameras, video input devices, and/or any other input device. Output device(s) 202 such as one or more displays, speakers, printers, and/or any other output device may also be included in device 192. Input device(s) 204 and output device(s) 202 may be connected to device 192 via a wired connection, wireless connection, or any combination thereof. In one embodiment, an input device or an output device from another computing device may be used as input device(s) 204 or output device(s) 202 for computing device 192.

Components of computing device 192 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 192 may be interconnected by a network. For example, memory 198 may be comprised of multiple physical memory units located in different physical locations interconnected by a network.

Those skilled in the art will realize that storage devices utilized to store computer readable instructions may be distributed across a network. For example, a computing device 210 accessible via network 208 may store computer readable instructions to implement one or more embodiments provided herein. Computing device 192 may access computing device 210 and download a part or all of the computer readable instructions for execution. Alternatively, computing device 192 may download pieces of the computer readable instructions, as needed, or some instructions may be executed at computing device 192 and some at computing device 210.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method of presenting to a user a first web page identified by a first location on a device having a processor, the method comprising:
    executing on the processor instructions configured to:
        obtain from the first location a first source document specifying a first coordinate set identifying a first region of the first web page, and a second coordinate set identifying a second region within a second web page available at a second location and to be presented within the first region of the first web page;
        obtain from the second location a second source document;
        render the second source document to generate a second rendered web page;
        extract from the second rendered web page the second region specified in the first source document as the second coordinate set;
        render the first source document to generate a first rendered web page inserting the second region extracted from within the second coordinate set of the second rendered web page into the first region of the first rendered web page defined by the first coordinate set; and
        present the first rendered web page to the user.

2. The method of claim 1:
    the second region having at least one second region dimension value for a region dimension;
    the first region having at least one first region dimension value for the region dimension that is different from the second region dimension value; and
    the instructions configured to adjust the second region extracted from the second web page to match the first region dimension value of the first region.

3. The method of claim 1:
    the second region configured to render as:
        a second region presentation when rendered within the second web page, and a first region presentation when rendered within a first region of a first web page; and
rendering the second web page comprising: rendering the second region of the second web page according to the first region presentation.

4. The method of claim 1, the second region comprising a second region presentation that:
when rendered within a first region of the first web page, matches the first region of the first web page; and
when rendered within a first region of a third web page that is different from the first web page, matches the first region of the third web page.

5. The method of claim 1:
the first web page restricted to a first domain; and
the second region restricted to a second domain associated with the second web page while presented within the first region.

6. The method of claim 5:
the device storing at least one second domain resource restricted to the second domain; and
the second region configured to access the at least one second domain resource.

7. The method of claim 6:
at least one second domain resource associated with an association of the user with the second web page; and
the second region configured to utilize the at least one second domain resource to personalize the second region for the user.

8. The method of claim 5:
the first web page specifying a third coordinate set specifying a third region of the first web page, wherein a fourth region identified by a fourth coordinate set of a third web page available at a third location is to be presented; and
the second region configured to communicate with the third region when presented within the first web page.

9. The method of claim 8, the second region configured to communicate directly with the fourth region within the first web page.

10. The method of claim 8:
the third web page associated with a second server; and
the second region configured to communicate with the fourth region within the first web page by sending a communication to the second server for delivery to the fourth region.

11. The method of claim 8, the second region configured to communicate with the fourth region within the first web page by:
configuring the second region to store on the device at least one domain resource restricted to a domain that is associated with the third web page; and
configuring the fourth region to retrieve the at least one domain resource that is associated with the third web page.

12. The method of claim 5, the second region configured to receive from the user a user interaction with the second region.

13. The method of claim 12, the second region configured to, upon receiving the user interaction:
notify a second server providing the second source document of the user interaction, and
upon receiving a second server response from the second server, update the second region presented within the first region of the first web page according to the second server response.

14. The method of claim 12, the instructions configured to, upon receiving the user interaction:
obtain from the second location a third source document;
render the third source document to produce a third rendered web page;
extract from the third rendered web page a third region; and
present the third region of the third web page to the user within the first region of the first web page.

15. The method of claim 12:
the first web page rendered in a second web page interface; and
the instructions configured to, upon receiving the user interaction:
instantiate a second web page interface;
render a second web page;
obtain from the second location a third source document;
render the third source document to produce a third rendered web page;
extract from the third rendered web page a third region; and
present the second web page to the user within the second web page interface.

16. The method of claim 12, the instructions configured to, upon receiving from the user the user interaction, notify a tracking server of the user interaction.

17. The method of claim 16, notifying the tracking server comprising: rendering the second region within a tracking frame rendered within the first region and restricted to a tracking domain associated with the tracking server, the tracking frame configured to:
receive the user interaction;
notify the tracking server of the user interaction; and
propagate the interaction into the first region of the first web page.

18. A system for rendering a first web page identified by a first location and including, in a first region of the first web page, a second region of a second web page, the system comprising:
a web page renderer comprising instructions stored in the memory that, when executed on the processor, cause the device to:
obtain from the first location a first source document specifying a first coordinate set identifying a first region of the first web page, and a second coordinate set identifying a second region within a second web page available at a second location and to be presented within the first region of the first web page;
obtain from the second location a second source document;
render the second source document to generate a second rendered web page; and
extract from the second rendered web page the second region specified in the first source document as the second coordinate set; and
render the first source document to generate a first rendered web page inserting the second region extracted from within the second coordinate set of the second rendered web page into the first region of the first rendered web page defined by the first coordinate set; and
a web page presenter comprising instructions stored in the memory that, when executed on the processor, cause the device to present the first rendered web page to the user.

19. A device presents a first web page identified at a first location, the device comprising:
- a display;
- a processor; and
- a memory storing instructions that, when executed by the processor, cause the device to:
  - obtain from the first location a first source document specifying a first coordinate set identifying a first region of the first web page, and a second coordinate set identifying a second region within a second web page available at a second location and to be presented within the first region of the first web page;
  - obtain from the second location a second source document;
  - render the second source document to generate a second rendered web page;
  - extract from the second rendered web page the second region specified in the first source document as the second coordinate set;
  - render the first source document to generate a first rendered web page inserting the second region extracted from within the second coordinate set of the second rendered web page into the first region of the first rendered web page defined by the first coordinate set; and
  - present the first rendered web page to the user.

20. The device of claim 19, wherein:
- the second region having at least one second region dimension value for a region dimension;
- the first region having at least one first region dimension value for the region dimension that is different from the second region dimension value; and
- the memory further stores instructions that, when executed on the processor, cause the device to adjust the second region extracted from the second web page to match the first region dimension value of the first region.

* * * * *